United States Patent [19]

Formo

[11] 3,723,037
[45] Mar. 27, 1973

[54] APPARATUS FOR INJECTION MOLDING ARTICLES FROM AMINOPLASTIC MATERIAL

[75] Inventor: Jerome L. Formo, St. Paul, Minn.
[73] Assignee: Plastics, Inc., St. Paul, Minn.
[22] Filed: Nov. 4, 1970
[21] Appl. No.: 86,726

[52] U.S. Cl. ............... 425/139, 425/806, 425/244, 425/252
[51] Int. Cl. ................................ B29f 1/14
[58] Field of Search .......................... 18/30 AM, 30 FM, 30 FA, 30 HM, 18/30 HB, 30 QM, 30 QF, 30 QT, 30 SR, 30 T, DIG. 1, 18, 2 RA, 2 RC, 2 RP, 2 QP, 2 QC, 2 RV, 2 RM; 264/334; 425/252, 251, 139, 165, 168, 244, DIG. 806

[56] References Cited

UNITED STATES PATENTS

| | | | |
|---|---|---|---|
| 3,231,656 | 1/1956 | Ninneman | 18/30 QT X |
| 2,547,151 | 4/1951 | Braeske | 18/12 ST |
| 3,137,038 | 6/1964 | Maynard | 18/30 QF X |
| 3,392,217 | 7/1968 | Zitzloff | 18/30 QQ X |
| 2,890,491 | 6/1959 | Hendry | 18/30 AM X |
| 2,828,509 | 4/1958 | Smucker et al. | 18/2 RC X |
| 2,828,507 | 4/1958 | Strauss | 18/30 RV |
| 3,278,992 | 10/1966 | Strauss | 425/136 |

Primary Examiner—J. Spencer Overholser
Assistant Examiner—David S. Safran
Attorney—Wicks & Nemer

[57] ABSTRACT

Apparatus performing according to the method for injection molding aminoplastic articles having large, flat, and smooth finished areas is disclosed. In the preferred embodiment shown, the aminoplastic material is metered from a hopper into a transfer cylinder while being maintained at a uniform temperature sufficient to soften it. A plunger in the transfer cylinder then pushes the softened aminoplastic material directly into the mold cavity of a two-part mold in a manner to maintain substantially the same passage area from the transfer cylinder to and into the mold cavity. The plastic is cured by the application of a second uniform and higher temperature, and the finished article is discharged. Two methods allowed by the present invention of discharging articles from the mold, by plunger movement and by air pressure, are also disclosed.

3 Claims, 6 Drawing Figures

INVENTOR.
JEROME L. FORMO
BY Wicks & Nemer
ATTORNEYS

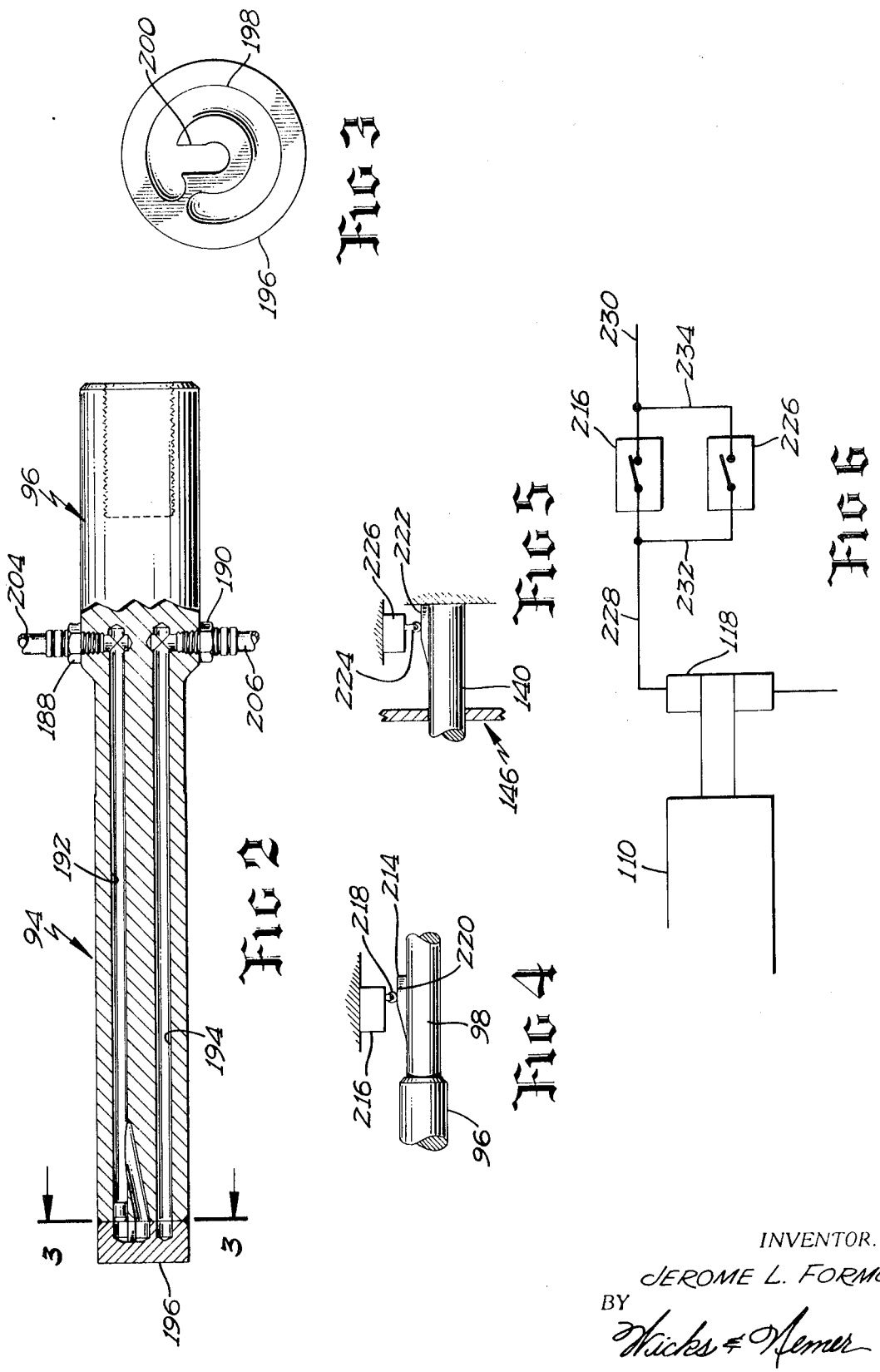

APPARATUS FOR INJECTION MOLDING ARTICLES FROM AMINOPLASTIC MATERIAL

BACKGROUND

The present invention relates generally to injection molding, more particularly to injection molding of aminoplastic material, and still more particularly to injection molding of aminoplastic material into articles having large, flat, and smooth finished areas.

In the past, difficulties have been encountered in injection molding such articles having large, flat, and smooth finished areas from aminoplastic material. For example, difficulties have been encountered in producing dishes for table use from melamine plastic. In attempting to produce melamine dishes with the conventional methods of injection molding, problems have arisen in maintaining the quality of the final product due to stress cracking about a position in the article which, in the mold, was adjacent the sprue opening and due to irregular flow patterns in the final article. Since melamine dishes have large, relatively flat, and relatively smooth finished areas, the flow patterns are immediately apparent and render them commercially unacceptable. The stress cracking of such dishes renders them not only commercially unacceptable, but unusable.

SUMMARY

The present invention solves these and other problems of injection molding aminoplastic articles having large, flat, and smooth finished areas by providing a method and apparatus operating according to that method which prevents stress buildup in the molded part and allows a uniform dispersion of material to thus eliminate both stress cracking and flow lines in the finished plastic article.

A preferred embodiment of apparatus according to the present invention includes a hopper for maintaining a supply of unplasticized aminoplastic material at room temperature and a two-part mold for ultimately molding the article. The unplasticized material is metered from the hopper and into a sprue block by a metering screw having a water bath circulating about it of sufficient temperature to change the state of the aminoplastic material from an unplasticized state to a plasticized, i.e., softened or fusible, state while not allowing the material to set. A transfer ram reciprocally mounted within a transfer cylinder and having a ram tip heated to a temperature sufficient to set the material then pushes the material from the transfer cylinder into the cavity in the mold, which is also heated to the setting temperature, to set the plastic material and mold the article. Insulating material is positioned between the sprue block and the mold to aid in the maintenance of the temperature difference between them.

In pushing the aminoplastic material within the transfer cylinder, the passage area is maintained of substantially the same size from the transfer cylinder to and into the mold cavity. In fact, the position of the ram is controlled such that at the end of its stroke, the ram tip forms a portion of the boundary of the mold cavity and aids in setting the material.

Thus, by providing specific heat zones and by transferring the plastic material into the mold cavity without restricting or reducing the area of the transfer passage, the method and apparatus according to the present invention allows the successful injection molding of aminoplastic articles having large, flat, and smooth finished areas without resulting in stress cracking in the final molded article.

A further feature of the present invention is that the maintenance of the passage area from the transfer cylinder to and into the mold cavity allows the removal of the finished molded article by either plunger movement or air pressure and also allows the purging of flash and other undesirable plastic molding residue from the transfer cylinder.

It is, therefore, an object of the present invention to provide a novel method and apparatus operating according to that method for injection molding of aminoplastic articles having large, flat, and smooth finished areas.

It is a further object of the present invention to provide a novel method and apparatus operating according to that method of injection molding aminoplastic articles having large, flat, and smooth finished areas without the occurrence of stress cracking or flow lines heretofore present in such injection molded articles.

It is a further object of the present invention to provide a novel method and apparatus according to that method for purging the transfer cylinder of flash and other undesirable molding residue.

It is a further object of the present invention to provide a novel method and apparatus for removing the molded article either by air or by plunger movement.

These and further objects and advantages of the present invention will become clearer in the light of the following detailed description of an illustrative embodiment of this invention described in connection with the drawings.

DESCRIPTION OF THE DRAWINGS

FIG. 2 shows an enlarged view of a ram shown in FIG. 1 with a portion thereof shown in section.

FIG. 3 is a sectional view of the ram tip of FIG. 2 according to section line 3—3 in FIG. 2.

FIGS. 4 and 5 show portions of the apparatus of FIG. 1 along with additional apparatus specifically arranged to provide for the removal of the molded article by ram movement.

FIG. 6 shows an electrical schematic indicating the preferred connection of portions of the apparatus shown in FIGS. 4 and 5.

Figure 1:
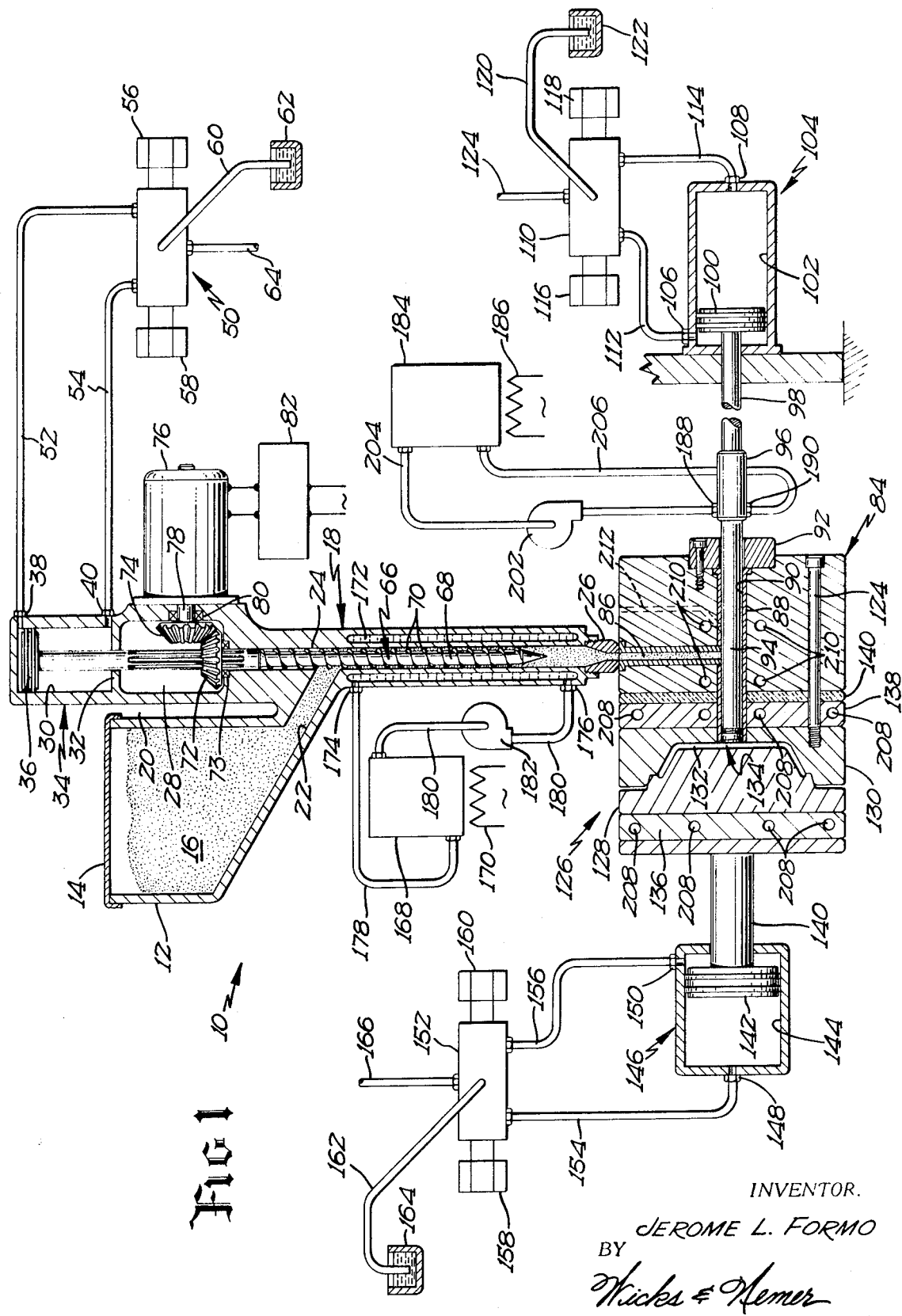
FIG. 1 shows a general representation of preferred apparatus operable according to the method of the present invention with some parts shown in section and some parts represented schematically.

Where used in the various figures of the drawings, the same numerals designate the same or similar parts. Furthermore, when the terms "right," "left," "upward," "downward," "vertical," and "horizontal," are used herein, it should be understood that these terms have reference only to the structure shown in the drawings as it would appear to a person viewing the drawings and are utilized only to facilitate describing the invention.

DESCRIPTION

In FIG. 1, injection molding apparatus, generally designated 10, is shown as including a hopper 12, having a lid 14, arranged to contain and maintain a supply of plastic material, generally designated 16, at room temperature and in an unplasticized state. Plastic material 16 is an aminoplastic material such as melamine formaldehyde, urea formaldehyde, or benzoguanamine formaldehyde and is commercially available from various sources.

Hopper 12 is separated from a metering housing 18 by means of an air gap 20 separating hopper 12 and metering housing 18 and extending downward between them until a hopper throat 22 is reached at the bottom of hopper 12. Hopper throat 22 communicates with a vertically arranged axial bore 24 within housing 18 which bore extends between a hollow nozzle 26 threaded onto the bottom end of housing 18 and a gear cavity 28 formed within the top of housing 18. Immediately over gear cavity 28 and again formed within housing 18 is another axial bore 30 separated from gear cavity 28 by an integrally formed wall 32.

Axial bore 30 forms a double acting hydraulic cylinder, generally designated 34, by mounting a hydraulic piston 36 for reciprocal motion along the central longitudinal axis of bore 30. Hydraulic fluid connectors 38 and 40 provide hydraulic fluid communication above and below piston 36, respectively, between a double acting four-way hydraulic control valve 50 connected to connectors 38 and 40 by means of hydraulic fluid lines 52 and 54. Valve 50 further includes electrically operated hydraulic control solenoids 56 and 58 for actuating valve 50. Further, valve 50 includes a return line 60 to a sump, indicated at 62, and a hydraulic fluid supply line 64.

A metering screw 66, including a shaft 68 and threads 70, is arranged within bore 24 of metering housing 18 and extends from a pointed bottom end adjacent nozzle 26 upwards along bore 24, through gear cavity 28, through wall 32, and into bore 30 where the top end of shaft 68 is joined with hydraulic piston 36. Conventional shaft seals, not shown, are positioned within wall 32 to allow the reciprocation of shaft 68 with respect to wall 32 without any leakage of hydraulic fluid from hydraulic cylinder 34 around shaft 68. Threads 70 are formed on shaft 68 from a point adjacent nozzle 26 to a point beyond hopper throat 22. Between threads 70 and bore 30, shaft 68 is slotted to slidably mount a bevel gear 72 at the bottom end of gear cavity 28. Bearing material 73 is mounted within housing 18 at the bottom of gear cavity 28 to allow the rotation of bevel gear 72. A second bevel gear 74 drives gear 72 and is in turn directly driven by an electrical motor 76 having a motor shaft 78 extending through housing 18 and journalled in a bearing 80 in housing 18. Electrical motor 76 is actuated by an electrical motor control 82.

Thus, with metering screw 66 in the position shown in FIG. 1, i.e., with piston 36 at the top of hydraulic cylinder 34, actuation of solenoid 56 will cause the introduction of hydraulic fluid above piston 36 thus causing metering screw 66 to move downward until the screw point at the bottom of screw 66 fits into the tapered portion of nozzle 26. Bevel gear 72 remains fixed at the bottom of gear cavity 28 and slides upon shaft 68 by means of the slots formed therein. Upon the actuation of motor control 82 to cause electric motor 76 to apply power to bevel gear 72 through bevel gear 74: the screw 66 turns clockwise; the clockwise turning threads 70 meter a fixed amount of plastic material 16 from hopper throat 22 into bore 24; and the plastic material filling threads 70 causes screw 66 to move upward against the action of retarding dampers, not shown, which apply a slight retarding force to screw 66 in order to insure a high density packing of plastic material within the threads 70 of screw 66 and avoid hollow spots. Shaft 68 again slidably passes through bevel gear 72 by means of the slots formed therein, and bevel gear 72 remains fixed at the bottom of gear cavity 28.

In the preferred embodiment, metering housing 18 is positioned such that screw 66 is vertically arranged, and metering housing 18 thus transfers plastic material 16 downward from hopper 12 to nozzle 26. Nozzle 26, in turn, is positioned vertically over a sprue block generally designated 84. Sprue block 84 includes a vertically arranged bore receiving a sleeve to define an accumulation chamber 86 extending from a position immediately below the adjacent nozzle 26 to approximately the center of sprue block 84. Sprue block 84 further includes a bore centrally arranged in a horizontal direction to receive a transfer sleeve 88 and to define a transfer cylinder 90 which joins with accumulation chamber 86. A sleeve retainer 92 is shown as bolted to the right side of sprue block 84 to prevent the lateral displacement of transfer sleeve 90 while allowing the reciprocation of a transfer ram 94 positioned within transfer cylinder 90 for horizontal reciprocal motion therein.

Transfer ram 94 also includes an enlarged right end 96, positioned outside of sprue block 84, which end is internally threaded to receive a hydraulic connection rod 98. Rod 98 is in turn attached to a hydraulic piston 100 arranged for horizontal reciprocal motion along the central longitudinal axis of a bore 102 of a double acting hydraulic cylinder generally designated 104. Cylinder 104 further includes hydraulic fluid connections 106 and 108 which provide hydraulic fluid communication leftward and rightward of piston 100, respectively, between a double acting four-way hydraulic control valve 110 connected to connections 106 and 108 by means of hydraulic fluid lines 112 and 114. Valve 110 further includes two electrically operated actuating solenoids 116 and 118 for electrically providing hydraulic fluid to one of lines 112 and 114, respectively. Further, valve 104 includes a return line 120 to a sump, indicated at 122, and a hydraulic fluid supply line 124.

Sprue block 84 shown as bolted, by means of a plurality of bolts, one of which is shown at 124, to a mold generally designated 126 positioned leftward of sprue block 84. Mold 126 includes two portions 128 and 130 which are joined together to define a mold cavity 132 between the portions. Portion 130 further includes an injection opening designated 134 for allowing the entrance of plastic material from the transfer cylinder 90 to mold cavity 132. Mold 126 further includes two supporting members 136 and 138 positioned upon outside opposite sides of mold portions 128 and 130.

Bolts 124 specifically connect sprue block 84 to mold portion 130 positioned adjacent the sprue block 84 but separated from it by means of a plate 140 of insulating material and supporting member 130 to thus support mold portion 130. Thus, sleeve 88 extends between sleeve retainer 92 on one end of sprue block 84, through insulating material 140, through supporting member 138, through mold section 130, and to mold cavity 132. Because sprue block 84 and mold 126 are maintained at distinctly different temperatures, as will be explained hereinafter, sleeve 88 is preferably of stainless steel or other material which has a lower than normal thermal conductivity. Also for aiding in maintaining the temperature difference between the sprue block 84 and the mold 126, insulating plate 140 in the preferred embodiment is formed of a commercially available cement asbestos type insulating board able to withstand high temperature and pressure.

Mold section 128 is attached to supporting member 136 which in turn is connected to a hydraulic connecting rod 140 attached to an hydraulic piston 142 horizontally reciprocally movable along the central longitudinal axis of a bore 144 formed within a double acting hydraulic cylinder generally designated 146. Hydraulic fluid connections 148 and 150 provide fluid communication leftward and rightward of piston 142, respectively, between a double acting four-way hydraulic control valve 152 connected to connections 148 and 150 by means of hydraulic fluid lines 154 and 156, respectively. Valve 152 further includes two electrically operable actuating solenoids 158 and 160 for selectively providing hydraulic fluid to lines 154 and 156. Still further, valve 152 includes a return line 162 to a sump, indicated at 164, and a hydraulic fluid supply line 166.

The injection molding apparatus 10 of FIG. 1 further includes a liquid reservoir 168 for holding a supply of a first liquid, such as water, and an electrically operable heater 170 for maintaining the water in reservoir 168 at a temperature of approximately 200° F. Metering housing 18 then further includes an annular chamber 172 forming a water jacket about bore 24 containing screw 66. Annular chamber 172 extends vertically of metering housing 18 to encircle screw 66 and maintain any plastic material within the threads of screw 66 at approximately 200° F. Metering housing 18 further includes fluid input connections 174 and 176 with connection 174 arranged immediately beneath hopper throat 22 and connection 176 arranged immediately above nozzle 26. A fluid conduit 178 then interconnects reservoir 168 and connection 174, and a fluid conduit 180 interconnects connection 176 and reservoir 168. Conduit 180 is shown as including a pump generally designated 182 to aid in the circulation of fluid from reservoir 168, through conduit 178, into chamber 172 through connection 174, around and about chamber 172, out of chamber 172 through connection 176, through conduit 180 and pump 182, and back to reservoir 168.

Still further, injection molding apparatus 10 of FIG. 1 includes a second reservoir 184 for maintaining a second liquid, for example oil, at a temperature of approximately 360° F. An electrically operable heater 186 is shown for maintaining the oil within reservoir 184 at this temperature. Enlarged portion 96 of transfer ram 94 also includes fluid connections 188 and 190, best seen in FIG. 2, threaded into ram 94 to communicate with a pair of longitudinally extending liquid transferring bores 192 and 194. Bores 192 and 194 are interconnected at the tip 196 of ram 94 through a semi-circular conduit 198. Conduit 198 further interconnects with a straight conduit 200 extending from the semi-circular conduit 198 to the center of tip 196 of ram 94. A pump 202 then draws hot oil from reservoir 184 through a conduit 204, supplies this oil to ram 94 through connection 188, forces the oil through bore 192, around and into conduits 198 and 200 in the tip 196 of ram 94, forces the oil back through conduit 194 and out of fluid connection 190, and finally forces the fluid back to reservoir 184 through a conduit 206 connecting reservoir 184 and fluid connection 190.

Oil from reservoir 184 is also forced, by conduits not shown, through a plurality of passages 208, shown in FIG. 1 in the end section, within supporting members 136 and 138 to heat mold 126, and specifically to heat any plastic material within mold cavity 132, to a temperature of 360° F. Similarly, water from reservoir 168 is also forced, by conduits now shown, through a plurality of passages 210, shown in FIG. 1 in end section, within sprue block 84 to heat sprue block 84, and specifically any plastic material within accumulation chamber 86 and transfer cylinder 90 to a temperature of 200° F.

OPERATION

In operating the apparatus of FIG. 1 according to the method of the present invention, oil within reservoir 184 is first heated to a nominal temperature of 360° F., within 10° to 30°, and water within reservoir 168 is heated to a nominal temperature of 200° F., within 10° to 20°. It is preferable that the conduction system associated with water reservoir 168 be a sealed system to help avoid the boiling of water within the system. Pump 202 is then energized to circulate oil from reservoir 184 to and throughout ram 94, and specifically tip 196, and to and throughout passages 208 within mold 126. Further, pump 182 is energized to circulate water from reservoir 186 to and throughout annular chamber 172 of metering housing 18 and to and throughout passages 210 within sprue block 84.

Next, accumulation chamber 86 is filled by plastic material through the hydraulically actuated, plunger-like, downward movement of screw 68 and electrically actuated, rotating, upward movement of screw 68, explained hereinbefore. During the initial cycles, it may be necessary to electrically heat nozzle 26 to properly maintain the temperature of the plastic material 16 within metering housing 18 before the frictional heat caused by transferring plastic material 16 downward through bore 24 reaches a steady state condition.

Thus, aminoplastic material 16 within hopper 12 is maintained at room temperature by means of air gap 20 between the heated metering housing 18 and hopper 12. At room temperature, the aminoplastic material is in an unplasticized state in the form of a loose powder which may easily descend through hopper throat 22 into heated metering housing 18 where it is heated to substantially 200° F. At 200° F. the aminoplastic material reaches an unplasticized or fusible thermal plastic state where it is softened to a heavy paste by a physical reaction of heat upon the plastic material 16. While the 200° temperature will not cure or set the aminoplastic material 16, it is important that uniform cycle times be maintained because highly different residences of the material at 200° will affect the cure or setting of the material.

At this point, repetitive injection molding of articles may be begun. for the purposes of explanation, it is assumed that apparatus 10 of FIG. 1 is in a position where: mold 126 is open, i.e., hydraulic piston 142 is positioned leftward in cylinder 146 rather than rightward as shown; ram 94 is retracted, i.e., hydraulic cylinder 100 is positioned rightward of cylinder 104 rather than leftward as shown; accumulation chamber 86 is filled in the manner described above; and metering screw 66 is in the retracted position shown. Under these initial conditions, the remaining operations of the present invention are as follows: solenoid 158 is actuated to cause control valve 152 to urge hydraulic piston 142 rightward and thus close mold 126 to where only mold cavity 132 remains between portions 128 and 130; solenoid 56 is actuated to cause hydraulic control 50 to move piston 36 and the interconnected metering screw 66 downward in a plunger-like fashion and force a fixed amount of material from accumulation chamber 86 into transfer cylinder 90; and solenoid 118 is actuated to cause hydraulic control valve 110 to move piston 100 leftward to thus cause a corresponding leftward movement of ram 94 and thus transfer the fixed amount of aminoplastic material in the transfer cylinder 90 leftward along transfer cylinder 90, through mold opening 134, and into mold cavity 132.

It will thus be seen that the fixed amount of aminoplastic material, sufficient to form the desired molded plastic article, is moved from a point in the transfer cylinder adjacent the accumulation chamber 86 to and into mold cavity 132 without any reduction of the passage area of the transfer cylinder 90 to thus maintain the same passage area of transfer cylinder 90. The lack of reduction of the passage area of cylinder 90 prevents the increase in velocity of material normally attendant such a passage reduction and avoids the shredding of any fibers within the plastic material. That is, a constant flow rate is maintained between the accumulation chamber 86 and the mold cavity 132 to avoid any sharp velocity increases which have been found to shred the reinforcing fibers contained within certain types of plastics, and the mold opening 134 is substantially equal in size to the cross-sectional area of the transfer cylinder 88. For a 4 inch diameter mold cavity 132, vertically as shown in FIG. 1, a transfer ram 94 and mold opening of 1 ½ inch diameter has been found to provide satisfactory results. These figures result in a mold opening area to projected mold cavity area ratio of approximately 14 percent. Mold opening to mold cavity area ratios below 4 percent present flow problems, while mold opening to mold cavity area ratios approaching 100 percent are to be preferred.

Thus, the teachings of the present invention of a mold opening area to projected mold cavity area ratio from 4 to 100 percent is in substantial contradistinction to previous injection molding apparatus where this ratio is a fraction of 1 percent, and commonly has an upper limit of 1 percent.

The use of this configuration of plastic material transfer and the use of the separate temperature zones thus prevents the stress cracking and flow line pattern problems heretofore found in previous aminoplastic molded articles having large, smooth, finished areas.

After the proper time interval depending on the article size, the type of plastic used, and other well known conditions, the aminoplastic article within mold cavity 132 is cured. During the curing time, control 82 actuates electric motor 76 to rotate metering screw 66 and meter a fixed amount of aminoplastic material 16 into screw threads 70, as heretofore explained. This action retracts metering screw 66 to the position shown in FIG. 1. After the proper curing time: solenoid 160 actuates control valve 152 to again move hydraulic piston 142 leftward to separate the mold portions 128 and 130; solenoid 116 actuates control valve 110 to cause hydraulic piston 100 to move rightward and withdraw or retract ram 94; and the finished plastic part is discharged. The procedure may then be repeated with the closing of the mold, the downward action of metering screw 66, and the leftward movement of transfer ram 94 to again mold a part.

A first method of discharging a finished plastic article from the separated mold halves may now be explained. Through the conventional technique of maintaining a slight difference of temperature between mold portions 128 and 130, a finished plastic article within mold cavity 132 may be caused to adhere to mold portion 130 upon the separation of mold parts 128 and 130. With the mold portions thus separated, a blast of air can be introduced into transfer cylinder 94 through an air passage 212 descending through sprue block 84 and angled towards mold 126. A blast of air through passage 212 then forces the molded article from mold cavity 132 and has the residual benefits of also clearing all flash and other molding residue from transfer cylinder 90. Of necessity, ram 94 must be retracted beyond the entrance of air passage 212.

The present invention further allows a second method of discharging a finished molded plastic article which does not require the retraction of ram 94. This method may be explained with the aid of FIGS. 4 to 6. In FIG. 4, hydraulic connection rod 98 is shown including an incline 214 having an electrical switch 216 mounted above it. A switch actuating roller follower extends downward from electrical switch 216 and is arranged to actuate switch 216 when roller 218 reaches the level portion 220 of incline 214. In the position shown in FIG. 4, the tip 196 of ram 94 is positioned flush with the mold opening 134, as shown in FIG. 1, and switch 216 provides one type of electrical output to hydraulic control 110 controlling the position of ram 94. With the position of the tip 196 of ram 94 withdrawn into sprue block 84, roller follower 218 occupies a position closer to enlarged end 96 of ram 94, and switch 216 provides another type of electrical signal output to hydraulic control 110 controlling the position of ram 94.

In FIG. 5, hydraulic connecting rod 140 is shown supporting a second incline 222 with a second roller follower 224 interconnecting a second electrical switch 226 and incline 222. In the position shown in FIG. 5, the portions 128 and 130 of mold 126 are separated, and switch 226 provides one type of electrical signal output to hydraulic control 110 controlling the position of ram 94. Upon the closing of the mold, roller follower 224 occupies a position leftward of that shown and off of incline 222. In this position, switch 216 provides another type of electrical signal output to hydraulic control 110 controlling the position of ram 94.

In FIG. 6, switch 216 is shown to be a normally closed electrical switch connected in series with the power to solenoid 118 controlling hydraulic valve 110 by two wires 228 and 230 to interrupt power to that solenoid upon the actuation of switch 216. Thus, during the portion of the stroke of ram 94 before the ram tip 196 reaches mold opening 134 of mold cavity 132, switch 216 provides an electrical output in the form of current flow through a short circuit. When ram tip 196 reaches a position flush with mold opening 134, roller follower 226 actuates switch 218 and a second electrical output is provided in the form of the stoppage of current flow by an open circuit which interrupts power to hydraulic control 110 and stops further forward progress of ram 94. Further, normally open electrical switch 226 is shown as connected in parallel with switch 216 by two wires 232 and 234 such that power to solenoid 118 is normally unaffected by switch 226, and upon actuation, switch 226 can provide power to solenoid 118 whether switch 216 is in its normal conducting state or its actuated non-conducting state. Thus, switch 226 senses the position of the mold parts by providing a first electrical output to control valve 110 controlling the position of ram 94 which indicates the mold portions are joined. This electrical output takes the form of the stoppage of current flow by an open circuit. Secondly, switch 226 provides an indication to valve 110 controlling the position of ram 94 indicating the mold portions are separated. This electrical output takes the form of providing current flow through a closed switch position for switch 226.

Thus, using the apparatus and technique shown in FIGS. 4 to 6, as the ram 94 reaches a position flush with mold opening 134 of mold cavity 132, roller 218 ascends incline 214 to first level 220 and actuates normally closed electrical switch 216 which interrupts power to solenoid 118 and stops forward progress of ram 94. After the curing process, mold portion 128 moves leftward to separate from mold portion 130, and reaches the position shown in FIG. 5. In FIG. 5, the normally open electrical switch 226 is actuated to again provide electrical energy to solenoid 118 and again cause ram 94 to move leftward to thus again disengage the molded electrical article which is assumed to have adhered to mold portion 130. Means, not shown, may then be used to recycle the apparatus 10. For example, the molded article may be caused to drop from mold 126, through a light beam indicating the proper discharge of that article, and the cycle electrically restarted.

Still further, ram 94 may be used to disengage the molded plastic article from mold 126, and as ram 94 retracts for the next cycle, air passage 212 may yet be used to discharge flash and other residue from transfer cylinder 90.

The apparatus and techniques shown and described in relation to FIGS. 4 to 6 offers still another advantage when used with the method and apparatus according to the present invention in that very thin flat parts such as plastic bowl covers may be made by injection molding. For mold cavity ratios nearer to the four percent value of the ratio of the area of mold opening 134 to the projected mold cavity area, discussed above, stress cracking and flow line problems can occur in molding substantially flat disc-like covers of, for example, eighty thousandths of an inch thickness since the passage area is greatly reduced by the dimension of the very part itself. That is, the part itself provides only an eighty thousandths of an inch passage. By use of the method and apparatus of the present invention, stress cracking and flow lines can be avoided by altering the operation as follows: instead of fully closing mold 126, apparatus similar to that shown and described in FIG. 5 can be used with very thin parts to cause mold portion 128 to momentarily stop short of a full closure with mold portion 130. For example, for an eighty thousandths cover, a mold separation of one hundred sixty to two hundred thousandths of an inch has been found sufficient to relieve stress and avoid flow lines. Next, solenoid 118 is actuated to cause hydraulic control 110 to move piston 100 left-ward and thus cause a corresponding leftward movement of ram 94 and thus transfer the fixed amount of aminoplastic material in transfer cylinder 90 leftward along transfer cylinder 90, through mold opening 134, and into mold cavity 132, as explained above. Mold portion 128 is thereafter moved rightward, as explained above, to complete the closure of mold 126 to where only mold cavity 132 remains between portions 128 and 130. The remaining operational steps are identical to that explained above.

Now that the basic teachings of the present invention have been explained, many extensions and variations will be obvious to one having ordinary skill in the art. For example, space 20 between hopper 12 and metering housing 18 is shown as providing the cooling for hopper 12. Specific cooling means may be used in place of space 20, however a simple space between the hopper and the metering housing is preferred.

Further, while water and oil were used to provide the specific heat zones of the present invention, many other fluids may be used, including steam.

Also, while temperatures of 360° and 200° have been described in connection with the preferred embodiment, these temperatures are preferred nominal temperatures for melamine formaldehyde aminoplastic material. No. specific limitation to these exact values is intended. Temperature ranges of from 170° to 240° and from 300° to 400° will suffice under various conditions. What is intended is to provide temperatures which first change the unplasticized aminoplastic material to a plasticized or fusible state through a physical reaction which softens the material but does not set the material, and a second temperature which is sufficiently high as to cause the nonreversible chemical reaction which causes the setting or hardening of the aminoplastic material. Depending upon other conditions, a broad range of temperatures are usable for specific plastics and articles.

Additionally, while the preferred embodiment of FIG. 1 has been explained using hydraulic controls, no limitation to this type of control is intended.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Apparatus for injection molding articles from aminoplastic material, comprising:
   a. a hopper arranged for receiving and holding aminoplastic material in an unplasticized state;
   b. a mold including at least two portions which may be joined together to define a mold cavity between the two portions, one portion including an injection opening for allowing the entrance of aminoplastic material into the mold cavity with the opening forming a portion of the molding surface of the mold cavity and with the opening forming from four to 100 percent of the projected cavity area of the mold cavity, the mold further including input means for receiving a first liquid at a first fixed temperature of a value to allow the setting of the aminoplastic material within the mold cavity, means for circulating the first liquid substantially throughout the mold, and output means for conducting the circulated first liquid out of the mold;
   c. a metering housing, the housing including an entry from the hopper and an exit for metered aminoplastic material, the housing further including input means for receiving a second liquid at a second fixed temperature of a value to change the aminoplastic material received from the hopper to a fusible state, means for circulating the second liquid substantially throughout the housing, and output means for conducting the circulated liquid out of the housing;
   d. means, positioned within the metering housing, for metering the aminoplastic material from the hopper to the exit of the metering housing in a controlled fashion;
   e. a sprue block having an accumulation chamber formed therein arranged to receive the aminoplastic material from the exit of the metering housing, the sprue block further including an input means for receiving the second liquid for maintaining the aminoplastic material in the fusible state, means for circulating the second liquid substantially throughout the sprue block, and output means for conducting the circulated liquid out of the sprue block;
   f. insulating means positioned between the sprue block and the mold for aiding in maintaining the temperature difference between the sprue block and the mold;
   g. transfer means arranged at least partially within the sprue block to receive the aminoplastic material from the accumulation chamber and inject the aminoplastic material into the injection opening of the mold, the transfer means including a ram for pushing the aminoplastic material from a position in the transfer means adjacent the accumulation chamber to and into the mold cavity and a transfer cylinder for supporting and guiding the transfer ram, the transfer cylinder extending at least from the accumulation chamber within the sprue block to the mold cavity within the mold to maintain substantially the same area from the accumulation chamber to the mold, the ram including an input means for receiving the first liquid, means for circulating the first liquid in at least the tip of the ram pushing the aminoplastic material, and output means for conducting the circulated liquid out of the ram, the transfer means including means for positioning the tip of the ram pushing the aminoplastic material such that at the end of the stroke of the ram, the ram end forms a portion of the boundary of the mold cavity and substantially fills the injection opening including ram position sensing means for providing a first output to the ram position control means during the portion of the stroke of the ram before the ram tip reaches the mold cavity and for providing a second output to the ram position control means indicating the ram tip is positioned at the boundary of the mold cavity, the first output causing the ram tip positioning means to urge the ram towards the mold and the second output causing the ram tip positioning means to at least momentarily stop the movement of the ram;
   h. means for supplying the first fixed temperature liquid to the mold and the ram;
   i. means for supplying the second fixed temperature liquid to the metering housing and the sprue block;
   j. means for separating the mold portions; and
   k. mold portion position sensing means for providing a first output to the ram tip positioning means indicating the mold portions are joined and for providing a second output to the ram tip positioning means indicating the mold portions are separated, the second output causing the ram tip positioning means to urge the ram into the mold cavity to thereby separate a molded article from the mold portion adjacent the transfer means, the ram tip positioning means thereafter retracting the ram.

2. The apparatus of claim 1, wherein a rod interconnects the ram tip positioning means and the ram, and wherein a rod interconnects the means for separating the mold portions and a mold portion, wherein the ram tip position sensing means includes a normally closed electrical switch positioned adjacent the ram connecting rod to sense the position of the ram, the switch being positioned to become nonconductive at the position of the ram where the ram tip is positioned at the boundary of the mold cavity, and wherein the mold portion sensing means includes a normally open electrical switch connected in electrical parallel with the ram position switch and positioned adjacent the mold connecting rod to become conducting upon the separation of the mold portions, the ram tip position sensing switch interrupting electrical power to the ram tip positioning means as the ram end reaches the mold cavity boundary to thereby stop the ram at the boundary of the mold cavity to allow the aminoplastic to cure within the mold cavity, and upon the separation of the mold portions by the separation means, the mold portion sensing electrical switch becoming conductive to again provide power to the ram tip positioning means and again urge the ram forward to thereby separate the article from the mold portion adjacent the transfer cylinder.

3. The apparatus of claim 1 wherein the sprue block includes means for receiving air under pressure, means for conducting the air under pressure to the transfer cylinder, and means for introducing a jet of air into the transfer cylinder upon the appropriate retraction of the ram away from the mold to thereby purge the transfer cylinder of flash and other undesirable aminoplastic molding residue.

* * * * *